United States Patent
Shuy et al.

(10) Patent No.: US 6,811,948 B2
(45) Date of Patent: Nov. 2, 2004

(54) THIN-FILM DESIGN FOR OPTICAL RECORDING MEDIA

(76) Inventors: Geoffrey Wen Tai Shuy, 4F, No. 123, Alley 3, Lane 219, Sec. 7, Chung-Shan N. Rd., Lin 25, Yung-Ho Li, Pei-Tou District, Taipei (TW); Yu-Chia Chang, No. 2, Kuo-Hsiao Lane, Lin 11, Pei-Tun Li, Pei-Tun District, Taichung (TW); Chu-Hsuan Cheng, 5F, No. 103, Chiu-Kang St., Wen-Shen District, Taipei (TW); Zuei-Chown Jou, 4F, No. 17, Lane 46, Ching-Cheng St., Lin 18, Sung-Chi Li, Sung-Shan District, Taipei (TW); Wen-Yang Ko, No. 161, Hsiao-Yang Rd., Lin 2, Chang-An Li, Changhua (TW)

( * ) Notice: Subject to any disclaimer, the term of this patent is extended or adjusted under 35 U.S.C. 154(b) by 9 days.

(21) Appl. No.: 09/785,310

(22) Filed: Feb. 20, 2001

(65) Prior Publication Data

US 2001/0021160 A1 Sep. 13, 2001

(30) Foreign Application Priority Data

Feb. 21, 2000 (TW) ........................................ 89102942 A

(51) Int. Cl.$^7$ .............................................. G11B 7/24
(52) U.S. Cl. .................................. 430/270.12; 428/64.4
(58) Field of Search ..................... 430/270.12, 271.2; 428/64.4

(56) References Cited

U.S. PATENT DOCUMENTS

| | | | |
|---|---|---|---|
| 4,587,533 A | * | 5/1986 | Nakane et al. ........... 346/135.1 |
| 5,458,941 A | | 10/1995 | Hintz |
| 6,335,071 B1 | * | 1/2002 | Fukano et al. ............. 428/64.1 |

FOREIGN PATENT DOCUMENTS

| | | | |
|---|---|---|---|
| EP | 0 822 543 A1 | * | 2/1998 |
| JP | 06171236 | | 6/1994 |
| JP | 08274809 | | 10/1996 |
| WO | WO00/04536 | * | 1/2000 |

* cited by examiner

Primary Examiner—John A. McPherson
(74) Attorney, Agent, or Firm—Birch, Stewart, Kolasch & Birch, LLP

(57) ABSTRACT

A thin-film optical recording medium and compatible materials is disclosed. When the transparent layer and the reflecting layer of the present invention are exposed to a light beam, the two layers react to form a semi-transparent reflective alloy/compound area. The presence of such area (1) decreases the effective optical thickness of the transparent layer and/or (2) forms a region of changed optical n & k and/or (3) changes the optical polarization angle. At least one of the above three effects produces an optical contrast before and after the recording from which the signal modulation required for reading the optical media can be derived. The present invention allows high-density, high-resolution, high-speed recording of data that is highly compatible with the full visible-light spectrum.

35 Claims, 5 Drawing Sheets

THIN-FILM DESIGN FOR OPTICAL RECORDING MEDIA

BACKGROUND OF THE INVENTION

1. Field of the Invention

The present invention is related to optical recording media, More specifically, the present invention is related to a thin-film optical recording medium and compatible materials that achieve high-density, high-resolution, high-speed recording of data, and are highly compatible with the full visible-light spectrum.

2. Description of the Related Art

Optical recording media has the advantage of easy recording and long-lasting data storage. Optical recording media is widely used in electronic publishing, multi-media data storage, and massive file-backup.

The structural components of conventional optical recording media include a substrate, a reactive layer, a reflecting layer and a protective layer, wherein the reactive layer is the primary recording element.

Typically, the reactive layer is made of organic dye. However, a reactive layer that is made of organic dye has disadvantages. First, organic dye can be easily degraded by environmental light exposure that results in a shortened product shelf life before recording. Second, the use of organic dye for optical recording media is less promising in future high-density optical-recording demands. Third, organic-dye formulation reacts within a narrow optical bandwidth and records with a specific wavelength of light source in a particular optical-recording system. Finally, production of organic dye requires organic solvents that might result in a certain level of environmental contamination.

Prior art (for example, JP Pat. No. 6-171236) discloses an inorganic optical recording medium with an Al/Au reflecting layer and a Ge reactive layer. The reflectivity of the design can be raised as high as 70%; however, the optical contrast after recording can only be elevated, not lowered, making it incompatible with the specifications of signal modulation of current optical recording media, and thus limiting its applications.

U.S. Pat. No. 5,458,941 discloses a reflecting layer consisting of Au—Cr, Au—Co, or Al—Ti and a reactive layer consisting of semiconductor materials. The reflecting layer is deposited on the incident side of the recording light beam to increase the reflectivity. However, this design requires higher recording power levels and thus limits its applications.

Recently, JP Pat. No. 08-274809 disclosed a recording layer consisting of a semiconductor layer and a reflecting metallic layer that can produce semiconductor/metal contacts inducing crystalline effect during light exposure. The amorphous semiconductor layer (the reacting layer, such as Si) will crystallize starting from the semiconductor/metal (such as Si/Al) interface which results in the modulation of the reflectivity of the recording layer. However, the signal modulation resulting from the amorphous/crystalline transformation is small and limited thereby limits the design's applicability to the diverse specifications of optical recording media.

Indeed, neither the inorganic materials type nor the organic dye type optical recording media of the conventional art can fulfill future demands for a high-density recording within the full visible-light range.

SUMMARY OF THE INVENTION

The objective of the present invention is to provide a thin-film optical recording medium and compatible materials able to achieve high-density, high-resolution, high-speed recording of data. It is another object of the present invention to provide a thin-film optical recording medium and compatible materials highly compatible with the full visible-light spectrum.

To accomplish the above, the optical recording medium of the present invention is at least composed of a substrate, a transparent layer, and a reflecting layer. The present invention utilizes a light beam to heat the transparent layer and the reflecting layer, thereby forming a semi-transparent reflective area that is an alloy and/or compound of the transparent layer and the reflecting layer by means of an alloy/compound reaction. The alloy/compound reaction requires a minimum power-density threshold. The semi-transparent reflective area achieves the following effects: (1) reducing the effective thickness of the transparent layer and altering the respective optical path lengths, resulting in a shift of constructive or destructive interference patterns; and/or (2) transforming the optical constants (n & k) and thus the reflective intensity; and/or (3) altering the polarization angle. At least one of the above effects constitutes the mechanism that produces optical contrast before and after recording.

The thin-film optical medium and compatible materials disclosed in the present invention are therefore capable of (1) recording within the full visible-light range; (2) high-density recording; (3) high-speed recording; (4) high-definition recording; and (5) recording with a high degree of compatibility with diverse optical recording media formats.

The reasons are as follows: (1) The selected metal or alloys of the reflecting layer reflects light with sufficient intensity and can react with the selected materials of the transparent layer to create a semi-transparent reflective area at any wavelength within the full visible-light range such that an optimum optical contrast level can be achieved. Hence, the optical-recordable media of the present invention is suitable for a wide spectrum of recording light; (2) The reaction that generates the semi-transparent reflective area requires a distinctive threshold energy density, and only upper part of the laser beam (Gaussian distribution) is effective for forming the recording, resulting in much smaller recorded marks than the writing laser footprint, and therefore high-recording density can be achieved; and (3) Both atoms of reflecting layer and transparent layer diffuse only few hundreds of Angstroms to form the semi-transparent area, and this reaction is much faster than that in recording a dye-based recordable media or in recording a phase-change type rewritable media. Therefore, the optical disc in the present invention is suitable for high speed recording; (4) The reaction that generates the semi-transparent reflective area requires a distinctive threshold energy density, which results in a sharp and clear border for the semi-transparent reflective area and produces high-definition recording marks; (5) The recording power can be easily adjusted by selecting suitable materials for the reflecting layer, so that the optical recording medium of the present invention can accommodate recording-power requirements of various optical recording media.

Further, the thin-film optical medium and compatible materials of the present invention are capable of recording at a wide range of wavelengths and applicable to not only the CD systems or the developing DVD systems but also the future blue-light wavelength optical-recording systems.

Furthermore, due to the minimum power density threshold requirement for the recording and the short time period of diffusion for the formation of recording mark, the recorded marks can be very small and quickly formed, making them superior for high-speed and high-density optical recording applications.

Another advantage of the present invention is that it provides a thin-film optical recording medium generating an optical reflective contrast that can be compliant with or counter to the current compact disk systems broadening the scope of its application. In addition, since the inorganic materials used in the present invention initiate reactions only above a threshold light intensity level, the thin-film design is insensitive to the general ambient lights and is therefore more optically stable and less apt to deteriorate compared to the dye-based recordable media.

Finally, the use of inorganic materials in the present invention eliminates the need for organic solvent(s), thus reducing environmental impact.

BRIEF DESCRIPTION OF THE DRAWINGS

The present invention will be described in detail with references to the illustrated embodiments and accompanying drawings, in which.

DETAILED DESCRIPTION OF THE PREFERRED EMBODIMENTS

Figure 1A:
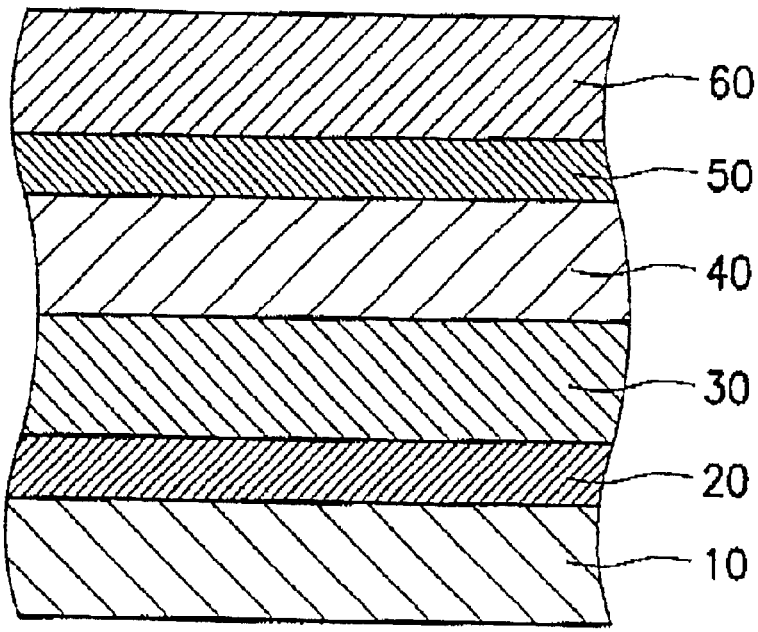
FIG. 1A is a schematic drawing showing the structure of an optical recording medium of the present invention with a thermal-manipulating layer.
Figure 1B:
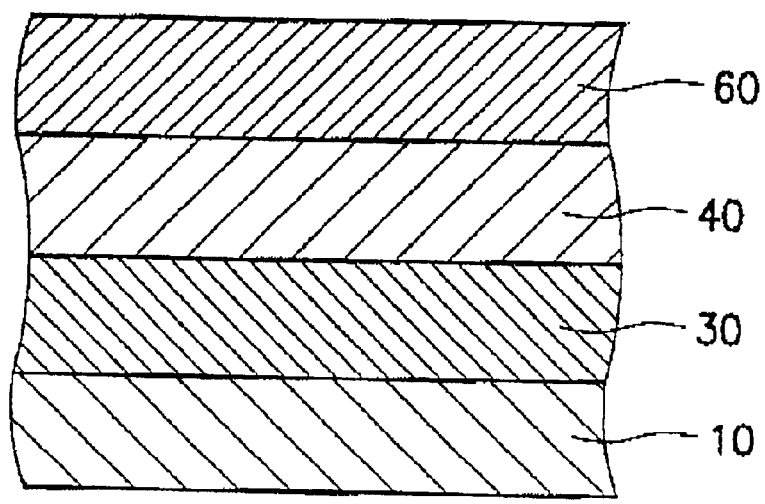
FIG. 1B is a schematic drawing showing the structure of an optical recording medium of the present invention without the thermal-manipulating layer.

Referring first to FIGS. 1A and 1B, the process of manufacturing an optical recording medium begins with a substrate 10. Substrate 10 can be made of glass or polycarbonate. An optional first thermal-manipulating layer 20 for either speeding or slowing thermal conduction may be formed on substrate 10 to control the writing power. Then, a transparent layer 30 is deposited, the thickness of which is about 5 to 500 nm. The transparent layer 30 can be selected from the group of material(s) consisting of Si, Ge, GaP, InP, GaAs, InAs, GaSb, InSb, In—Sn oxide, tin oxide, indium oxide, zinc oxide, titanium oxide, Sb—Sn oxide, and/or combinations thereof.

Next, the reflecting layer 40 is formed on the transparent layer 30. The thickness of the reflecting layer 40 is about 1 to 500 nm. The reflecting layer 40 can be selected from the group of material(s) consisting of Ag, Al, Au, Pt, Cu, In, Sn, W, Ir, Re, Rh, Ta, alloys, and/or combinations thereof.

Figure 2A:
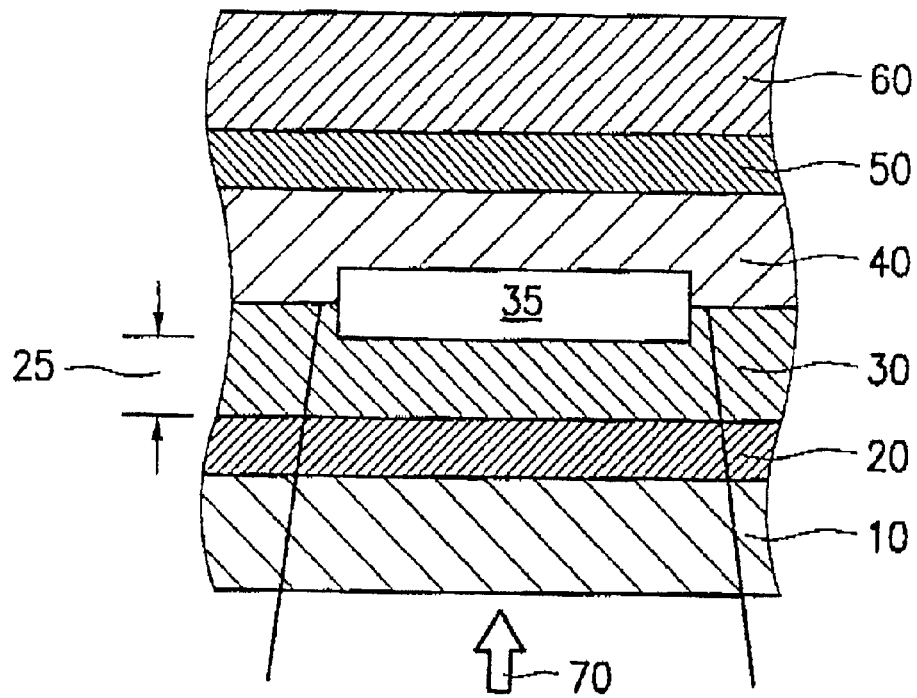
FIG. 2A is a schematic drawing showing the altered structure (with the thermal-manipulating layer) after writing the optical recording medium of the present invention with a light beam.
Figure 2B:
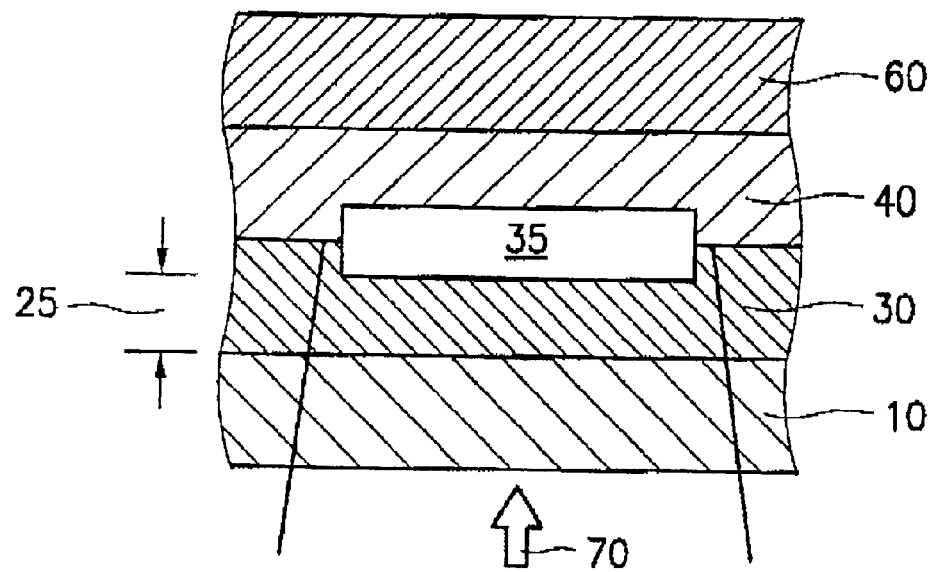
FIG. 2B is a schematic drawing showing the altered structure (without the thermal-manipulating layer) after writing the optical recording medium of the present invention with a light beam.

The individual thickness and chemical compositions of the transparent layer 30 and the reflecting layer 40 are selected such that, when heated by a light beam, the transparent layer 30 and the reflecting layer 40 will react to form a semi-transparent reflective area 35 (as shown in FIGS. 2A and 2B). The chemical composition of the semi-transparent reflective area is an alloy and/or compound of the transparent layer 30 and the reflecting layer 40. The presence of the semi-transparent reflective area 35 (the recorded mark) produces an optical reflecting contrast against the non-recorded area of the reflecting layer.

The optical reflecting contrast produced by the presence of the semi-transparent reflective area 35 leads to signal modulation within the full visible-light range from at least one of the following effects; (1) As a result of the alloy/compound effect, the semi-transparent reflective area 35 changes the optical constants (n & k) in the area thus altering the overall reflectivity; (2) The presence of the semi-transparent reflective area 35 reduces the effective thickness of the transparent layer 30 and alters the respective optical-path lengths thereby shifting constructive or destructive interference; and (3) Due to the alloy/compound effect, the semi-transparent reflective area 35 changes the polarization angle thus altering the intensity read by the polarization optics.

Subsequently, an optional second thermal-manipulating layer 50 for either speeding or slowing thermal conduction may be formed on substrate 10 to control the writing power. Finally, a protecting layer 60 is deposited either on the reflecting layer 40 or on the optional second thermal-manipulating layer 50. The resulting structure is shown in FIGS. 1A and 1B, where FIG. 1A is a schematic drawing showing the structure with thermal-manipulating layers and FIG. 1B is the schematic drawing showing the structure without thermal-manipulating layers. Depending on the combinations of the transparent layer 30 and the reflecting layer 40, the thin-film design may or may not include thermal-manipulating layers.

Embodiments of the present invention show that, by varying the thickness of the effective transparent layer 25 of the transparent layer 30, the manner of signal modulation can be changed. When the thickness is greater than a specific value or less than another specific value, the manner of signal modulation can be switched from one where the pre-recording reflectivity is greater than that of the recorded, to another where the pre-recording reflectivity is lower than that of the recorded. The inverse is also possible, Embodiment 1

In this embodiment, an optical recording medium was prepared by magnetron-sputtering a silicon target on a glass substrate 10 to form a transparent layer 30. The sputtering power was set at 300 W and the sputtering time was 30 minutes. A reflecting layer 40, deposited next, was an Au—Si alloy wherein Au was sputtered at a power of 260 W and Si was sputtered at a power of 210 W for 30 minutes. The resulting structure is shown in FIGS. 1A and 1B.

To test the recording performance for the optical recording medium, a static tester was used. The static tester uses a laser diode of 780 nm wavelength that requires a 21 mA DC current for reading signals and the DC current further superimposes 1–5V pulses for writing marks (the shortest write-pulse being 10 ns). The optical system is similar to that of the CD system, except that the diameter of the light beam is greater than that of the CD system.

Figure 3:
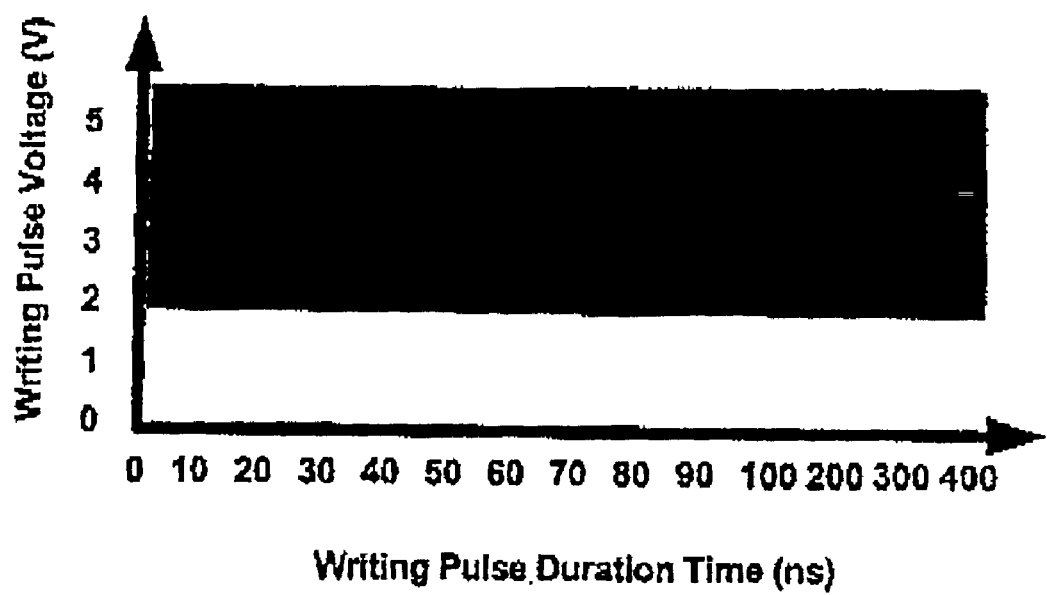
FIG. 3 is an optical micrograph taken after performing the static test in Embodiment 1.

FIG. 3 is an optical micrograph of recorded marks after the static test. The micrograph shows that the semi-transparent reflective area 35 (the recorded marks being about 2 μm in diameter) has distinct boundary even with superimposed 3V pulses on 21 mA DC current with pulse duration down to 10 ns, The optical contrast of the recording is 85%. The optical contrast is defined as (Io−Iwr)/Io'100% wherein Io is the pre-recording reflectivity and Iwr is the reflectivity of the recorded marks, Applying the same test conditions to the commercial CD-R, the size of the recorded mark is around 16 μm in diameter and the optical contrast is 50%.

Embodiment 2

In this embodiment, an optical recording medium was prepared by magnetron-sputtering a silicon target on a glass substrate 10 to form a transparent layer 30. The sputtering power was set at 300 W and the sputtering time was 10 minutes. The reflecting layer 40, deposited next, was an Au—Si alloy wherein Au was sputtered at a power of 260 W and Si was sputtered at a power of 210 W for 30 minutes. The resulting structure is shown in FIGS. 1A and 1B.

Figure 4:
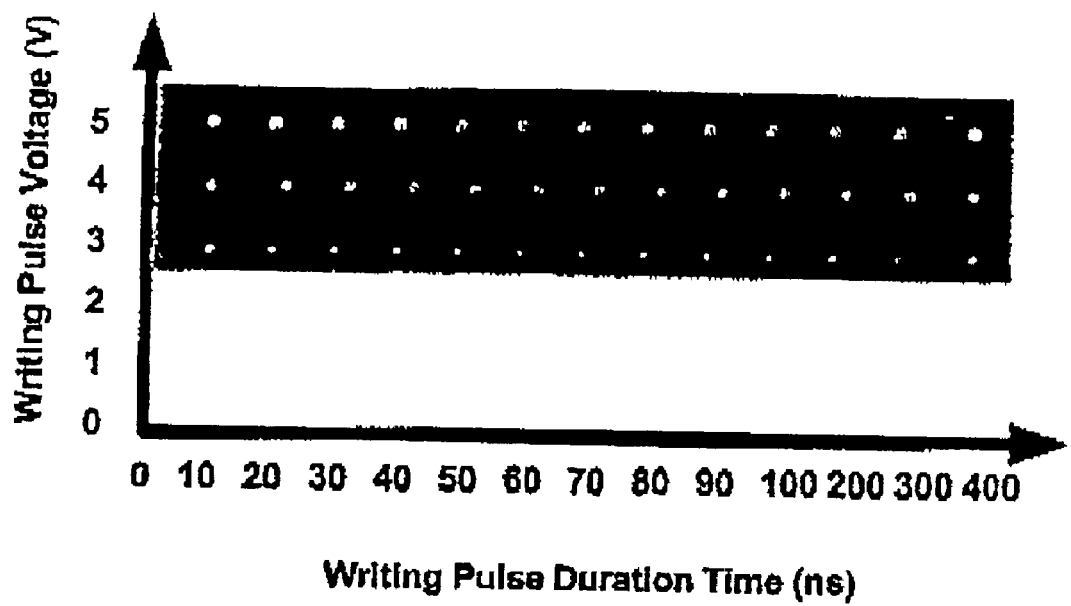
FIG. 4 is an optical micrograph taken after performing the static test in Embodiment 2.

FIG. 4 is an optical micrograph of recorded marks after the static test. The test conditions are the same as that of Embodiment 1. FIG. 4 indicates that the reflectivity of semi-transparent reflective area 35 is raised when applying 3V pulses superimposed on a 21 mA DC current at all pulse duration. The greatest optical contrast achieved was −45 percentage. The smallest size of the recorded marks achieved was 2.0 μm.

Embodiment 3

In this embodiment, optical recording media specimens were prepared individually by magnetron-sputtering a silicon target on a glass substrate 10 to form a transparent layer 30. The sputtering power was set at 300 W and the sputtering times were 5, 10, 15, 20, 25, 30, 35 and 40 minutes respectively. A reflecting layer 40, deposited next, was Au—Si alloy where Au was sputtered at powers of 50, 110, 180, 240, 300, 370, 440, and 500 W and Si was sputtered at a power of 210 W. The resulting structure is shown in FIGS. 1A and 1B. There is no protecting layer. The test conditions of the static tests followed were the same as those in Embodiment 1.

Summarizing the reflectivity measurements of all specimens in this embodiment, the reflectivities in wavelength range from 300 nm to 900 nm are between 5 to 90%. Table 1 shows the highest and lowest reflectivity of this embodiment at respective wavelengths and reveals that the optical recording medium of the present invention retains high reflectivity within the full visible-light range.

TABLE 1

| Wavelength (nm) | 780 | 650 | 400 |
|---|---|---|---|
| Highest Reflectivity (%) | 55 | 62 | 37 |
| Lowest Reflectivity (%) | 8 | 14 | 24 |

Table 2 illustrates the largest optical contrast (positive and negative) resulting from all possible combinations of the transparent layer and the reflecting layer in this embodiment at optical wavelengths 780 nm, 650 nm, and 400 nm. Table 2 shows that the optical recording medium of the present invention have sufficient optical contrast within the full visible-light range for signal modulation that is either compliant with or counter to the concurrent compact disk systems, where positive optical contrast is compliant with the signal modulation of the concurrent compact disk systems while negative optical contrast is counter to the concurrent system.

TABLE 2

| Wavelength (nm) | 780 | 650 | 400 |
|---|---|---|---|
| Positive Contrast (%) | 85 | 80 | 50 |
| Negative Contrast (%) | −90 | — | −50 |
|  |  | 100 |  |

Embodiment 4

In this embodiment, four samples were prepared by magnetron-sputtering on a polycarbonate (PC) substrate 10 with a layer sequence of PC/(ZnS.SiO$_2$)$_1$/Si/(Si—Au)/(ZnS.SiO$_2$)$_2$. Sample 1 contained no (ZnS.SiO$_2$)$_2$ and (ZnS.SiO$_2$)$_2$, sample 2 contained no (ZnS.SiO$_2$)$_1$, and sample 3 contained no (ZnS.SiO$_2$)$_2$.

The sputtering power for Si (transparent layer 30) was set at 300 W and the sputtering time is 30 minutes. The sputtering power for ZnS.SiO$_2$ (the first and the second thermal-manipulating layer 20 and 50) was set at 300 W and the sputtering time is 30 minutes. A reflecting layer 40 (Au—Si alloy) was co-sputtered at a power of 260 W for Au and was sputtered at a power of 210 W for Si for 30 minutes.

Figure 5:
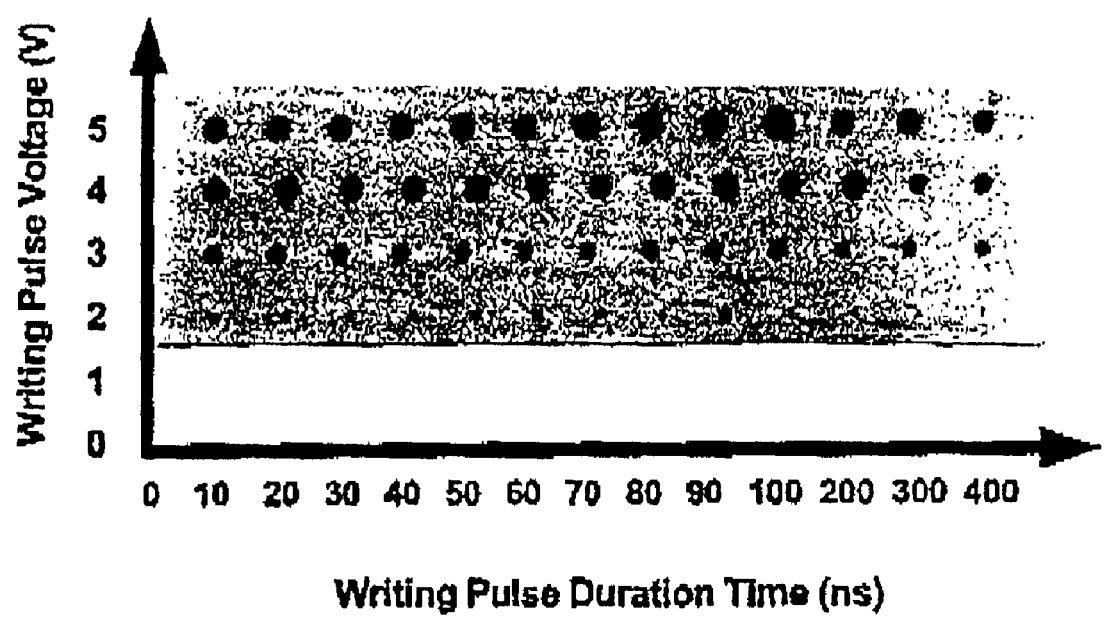
FIG. 5 is an optical micrograph taken after performing the static test in Embodiment 3.

The static test conditions were the same as that of Embodiment 1. FIG. 5 is an optical micrograph taken after the static test of sample 1. The micrograph shows that the reflectivity of the semi-transparent reflective area 35 is decreased when applying 2V pulses superimposed on a 21 mA DC current at all pulse duration.

When superimposing 2V pulses at all pulse duration, the sizes of the semi-transparent reflective area 35 appeared to be below 1.5 μm. The optical contrasts before and after the recording are between 51% and 70%. The smallest size is under 1.5 μm with 10 ns writing pulse duration while the optical contrast before and after the recording reaches 51%.

When superimposing 3V pulses, the largest optical contrast can reach 100% and the smallest size can be 2.0 μm.

Similar results could be obtained for recording sample 2 to 4. However, for sample 2 and 3 no recorded mark was observed as the writing pulse duration was lower than 100 ns for 2 V writing pulse, and the value was 200 ns/2V for sample 4. It is clear that the optimum writing strategy can be changed by adding the thermal-manipulating layer 20 and/or 50 (ZnS.SiO2).

Embodiment 5

In this embodiment, an optical-recording media was prepared by magnetron-sputtering an In—Sn oxide target onto a glass substrate 10 to form a transparent layer 30 of about 50 nm in thickness. A reflecting layer 40, deposited next, was Sn. The resulting structure is shown in FIGS. 1A and 1B.

Static test conditions were the same as that of Embodiment 1. The results show that the reflectivity of the semi-transparent reflective area 35 is decreased when applying more than 1V pulses superimposed on a 27 mA DC current at all pulse duration.

When superimposing 2V pulses, the sizes of the semi-transparent reflective area 35 are below 1.5 μm. The optical contrasts before and after the recording are between 30% and 60%. The smallest size is under 1.5 μm with 10 ns writing pulse duration while the optical contrast before and after the recording reaches 48%. When superimposing 3V pulse, the greatest optical contrast can reaches 60%.

Although the present invention has been disclosed by a limit number of embodiments shown above, it should be understood that the present invention is not limited to the disclosed embodiments for any person who are skilled in the arts of the present invention could make various modifications or similar arrangements that are possible without departing from the principles and spirit of the present invention. Therefore, the scope of the appended claims and their equivalents should be accorded the broadest interpretation to encompass all such modifications and similar arrangements.

What is claimed is:

1. An optical recording medium for recording and retrieving information with an optical beam comprising:
    a substrate;
    a transparent layer, having a predetermined thickness such that the reflectivity after recording is decreased, which is reactive (optically or thermally) with a reflecting layer disposed thereon to form a semi-transparent reflective area of alloy/compound across the interface there between, comprising a material selected from the group consisting of Si, Ge, GaP, InP, GaAs, InAs, GaSb, InSb, In-Sn oxide, tin oxide, indium oxide, zinc oxide, titanium oxide, Sb-Sn oxide, or combinations thereof disposed on the substrate; and
    a reflecting layer disposed on the transparent layer, which is reactive (optically or thermally) with the transparent layer of the predetermined thickness to form a semi-transparent reflective area of alloy/compound across the interface of transparent layer and reflecting layer after the optical recording medium is exposed to the optical beam, wherein the semi-transparent reflective area activates a mechanism that decreases the reflectivity after recording;
    wherein the mechanism reduces the effective thicknesses of the transparent layer and the reflecting layer, and changes the optical-path of the incident and reflected light from the optical beam, thereby shifting constructive or destructive interference and altering the reflective intensity by the semi-transparent reflective area.

2. The optical recording medium of claim 1, wherein the mechanism distorts optical constants (n & k) and thereby alters the overall reflective intensity.

3. The optical recording medium of claim 1, wherein the mechanism transforms the polarization angle and thereby alters the reflective intensity by the semi-transparent reflective area.

4. The optical recording medium of claim 1, wherein the transparent layer has a thickness ranging from 5 to 500 nm.

5. The optical recording medium of claim 1, wherein the reflecting layer has a thickness ranging from 1 to 500 nm.

6. The optical recording medium of claim 1, wherein the reflecting layer comprises a material selected from the group consisting of Ag, Al, Au, Pt, Cu, In, Sn, W, Ir, Re, Rh, Ta, and their alloys, or combinations thereof.

7. The optical recording medium of claim 1, further comprising a thermal-manipulating layer between the substrate and the transparent layer.

8. The optical recording medium of claim 1, further comprising a protective layer disposed on the reflecting layer.

9. The optical recording medium of claim 8, further comprising a thermal-manipulating layer between the reflecting layer and the protective layer.

10. The optical recording medium of claim 1, wherein the semi-transparent reflective area is more reflective than the reflecting layer.

11. The optical recording medium of claim 1, wherein the semi-transparent reflective area is less reflective than the reflecting layer.

12. A method of optically recording information on an optical recording medium comprising a substrate, a transparent layer, having a predetermined thickness such that the reflectivity after recording is decreased, which is reactive (optically or thermally) with a reflecting layer disposed thereon to form a semi-transparent reflective area of alloy/compound across the interface there between, comprising a material selected from the group consisting of Si, Ge, GaP, InP, GaAs, InAs, GaSb, InSb, In-Sn oxide, tin oxide, indium oxide, zinc oxide, titanium oxide, Sb-Sn oxide, or combinations thereof disposed on the substrate, and a reflecting layer reactive (optically or thermally) with the transparent layer of the predetermined thickness disposed on the transparent layer, which comprises irradiating the transparent layer of the predetermined thickness and reflecting layer with an optical beam to form a semi-transparent reflective area of alloy/compound therebetween, wherein the semi-transparent reflective area is able to activate a mechanism that decreases the reflectivity after recording, wherein the mechanism reduces the effective thicknesses of the transparent layer and the reflecting layer, and changes the optical-path of the incident and reflected light from the optical beam, thereby shifting constructive or destructive interference and altering the reflective intensity by the semi-transparent reflective area.

13. The method as claimed in claim 12, wherein the mechanism distorts optical constants (n & k) and thereby alters the overall reflective intensity by the semi-transparent reflective area.

14. The method as claimed in claim 12, wherein the mechanism transforms the polarization angle and thereby alters the reflective intensity by the semi-transparent reflective area.

15. The method as claimed in claim 12, wherein the transparent layer has a thickness ranging from 5 to 500 nm.

16. The method as claimed in claim 12, wherein the reflecting layer has a thickness ranging from 1 to 500 nm.

17. The method as claimed in claim 12, wherein the reflecting layer comprises a material selected from the group consisting of Ag, Al, Au, Pt, Cu, In, Sn, W, Ir, Re, Rh, Ta, and their alloys, or combinations thereof.

18. The method as claimed in claim 12, wherein the semi-transparent reflective area is more reflective than the reflecting layer.

19. The method as claimed in claim 12, wherein the semi-transparent reflective area is less reflective than the reflecting layer.

20. An optical recording medium for recording and retrieving information with an optical beam comprising:
    a substrate;
    a transparent layer, comprising at least an oxide selected from the group consisting of In-Sn oxide, tin oxide, indium oxide, zinc oxide, titanium oxide, Sb-Sn oxide, or combinations thereof, disposed on the substrate; and
    a reflecting layer disposed on the transparent layer, which is reactive (optically or thermally) with the transparent layer and forms a semi-transparent reflective area of alloy/compound across the interface of transparent layer and reflecting layer after the optical recording medium is exposed to the optical beam, wherein the semi-transparent reflective area activates a mechanism that decreases the reflectivity after recording,
    wherein the mechanism reduces the effective thicknesses of the transparent layer and the reflecting layer, and changes the optical-path of the incident and reflected light from the optical beam, thereby shifting constructive or destructive interference and altering the reflective intensity by the semi-transparent reflective area.

21. The optical recording medium of claim 20, wherein the mechanism distorts optical constants (n & k) and thereby alters the overall reflective intensity.

22. The optical recording medium of claim 20, wherein the mechanism transforms the polarization angle and thereby alters the reflective intensity by the semi-transparent reflective area.

23. The optical recording medium of claim 20, wherein the transparent layer has a thickness ranging from 5 to 500 nm.

24. The optical recording medium of claim 20, wherein the reflecting layer comprises a material selected from the group consisting of Ag, Al, Au, Pt, Cu, In, Sn, W, Ir, Re, Rh, Ta, and their alloys, or combinations thereof.

25. The optical recording medium of claim 20, wherein the reflecting layer has a thickness ranging from 1 to 500 nm.

26. The optical recording medium of claim 20, further comprising a thermal-manipulating layer between the substrate and the transparent layer.

27. The optical recording medium of claim 20, further comprising a protective layer disposed on the reflecting layer.

28. The optical recording medium of claim 27, further comprising a thermal-manipulating layer between the reflecting layer and the protective layer.

29. The optical recording medium of claim 20, wherein the semi-transparent reflective area is more reflective than the reflecting layer.

30. The optical recording medium of claim 20, wherein the semi-transparent reflective area is less reflective than the reflecting layer.

31. An optical recording medium for recording and retrieving information with an optical beam comprising:
   a substrate;
   a transparent layer, having a predetermined thickness ranging from 5 to 500nm such that the reflectivity after recording is decreased, which is reactive (optically or thermally) with a reflecting layer disposed thereon to form a semi-transparent reflective area of alloy/compound across the interface there between, comprising a material selected from the group consisting of Si, Ge, GaP, InP, GaAs, InAs, GaSb, InSb, or combinations thereof disposed on the substrate; and
   a reflecting layer disposed on the transparent layer, which is reactive (optically or thermally) with the transparent layer of the predetermined thickness to form a semi-transparent reflective area of alloy/compound across the interface of transparent layer and reflecting layer after the optical recording medium is exposed to the optical beam, wherein the semi-transparent reflective area activates a mechanism that decreases the reflectivity after recording,
   wherein the mechanism reduces the effective thicknesses of the transparent layer and the reflecting layer, and changes the optical-path of the incident and reflected light from the optical beam, thereby shifting constructive or destructive interference and altering the reflective intensity by the semi-transparent reflective area.

32. The optical recording medium of claim 31, wherein the mechanism distorts optical constants (n & k) and thereby alters the overall reflective intensity.

33. The optical recording medium of claim 31, wherein the mechanism transforms the polarization angle and thereby alters the reflective intensity by the semi-transparent reflective area.

34. The optical recording medium of claim 31, wherein the reflecting layer has a thickness ranging from 1 to 500 nm.

35. The optical recording medium of claim 31, wherein the reflecting layer comprises a material selected from the group consisting of Ag, Al, Au, Pt, Cu, In, Sn, W, Ir, Re, Rh, Ta, and their alloys, or combinations thereof.

* * * * *